United States Patent Office 3,302,897
Patented Feb. 7, 1967

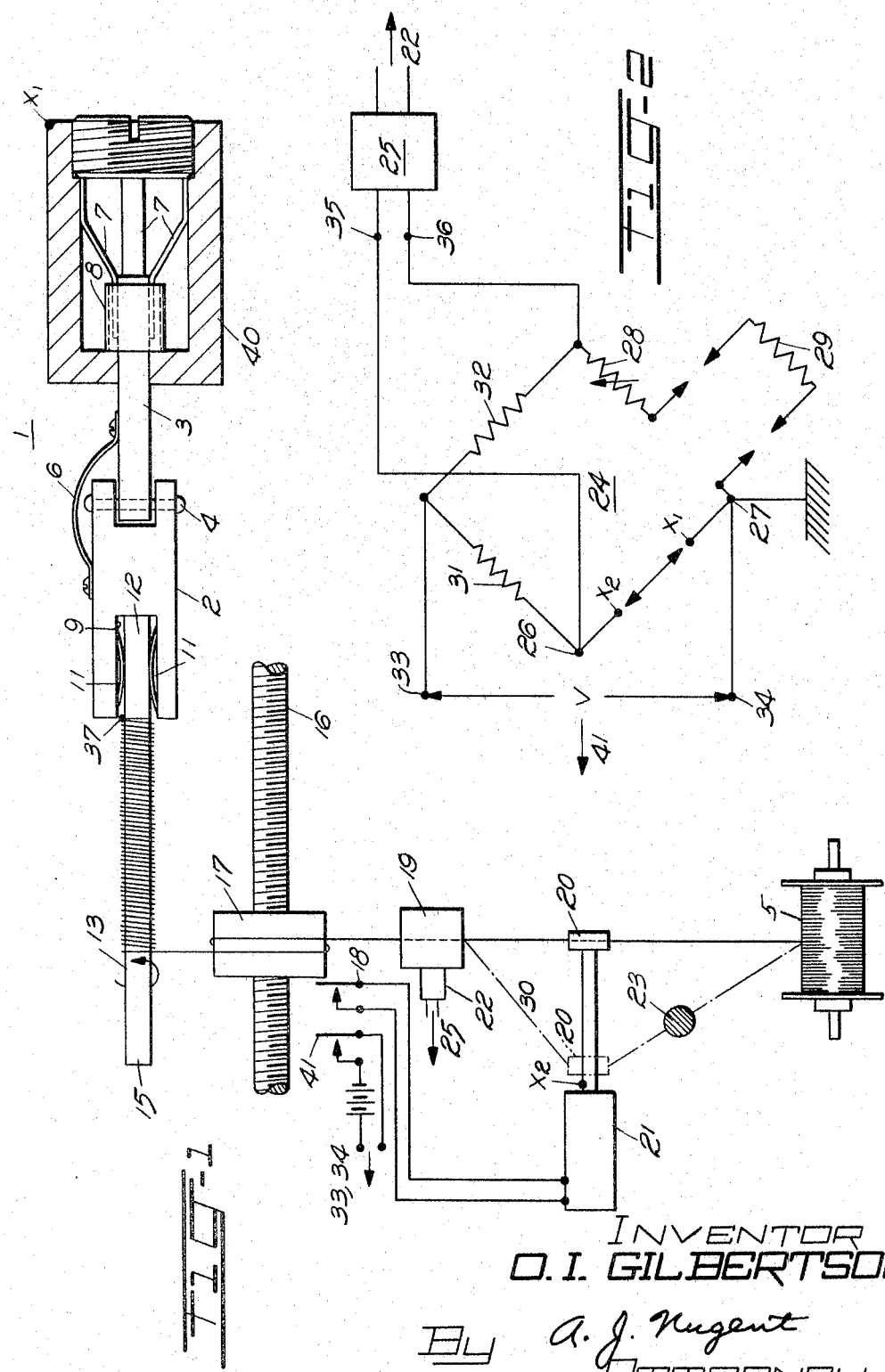

3,302,897
MACHINE FOR SINGLE-STEP WINDING AND CALIBRATION OF ELECTRICAL ARTICLES
Oswald I. Gilbertson, Nutley, N.J., assignor to Western Electric Company, Incorporated, New York, N.Y., a corporation of New York
Filed Feb. 26, 1962, Ser. No. 175,633
5 Claims. (Cl. 242—9)

This invention relates to the manufacture of coils and, more particularly, to a method and apparatus for winding coils to a predetermined magnitude of an electrical property such as resistance or inductance.

In general, the methods and apparatus that have heretofore found employment in the winding of such articles have not proven altogether satisfactory, primarily because of the difficulties inherent therein in providing a finished article calibrated to a degree of accuracy commensurate with the requirements of modern technology. Further, such methods and apparatus are usually found to necessitate the use of relatively complex and expensive electromechanical systems which prove, in many instances, to be difficult and time consuming to adjust, operate, and maintain. As a result, the cost factor may be held at a high rate.

It is, accordingly, an object of this invention to provide a method and apparatus whereby electrical coils may be conveniently wound and concurrently calibrated in a most accurate manner.

It is a further object of this invention to provide a method and apparatus wherein such winding and calibration may be more rapidly effected than has heretofore been possible.

Another object of the invention is the provision of apparatus as above of significantly reduced complexity which entail less cost in the fabrication and maintenance thereof than do the devices of the prior art.

Broadly speaking, the invention embraces a method of winding electrical coils to provide a predetermined magnitude of an electrical property such as resistance or inductance and comprising the following steps: winding wire about a core, connecting measuring means to the moving wire at a point in advance of the core when almost the required number of turns have been wound, severing the wre when the predetermined magnitude is measured by the measuring means, and continuing to wind the wire on the core until the severed end is reached.

In a preferred embodiment herein disclosed, the method and apparatus of the invention are adapted for the winding and calibration of flat-type resistors and will be seen to comprise rotating contact winding means for winding resistance wire about a resistor core, and detecting means for detecting when an almost sufficient length of wire has been wound about the core to furnish the desired resistance. Contact switch means, included in the detecting means, are provided to place the wound length of wire in a resistance measuring circuit whereby cutting means, controlled by the circuit, may be activated to sever the wire being wound on the core when the resistance thereof is indicated by the said measuring circuit to equal the desired resistance.

The details and the above and other objects and advantages of the invention are believed made clear by reference to the accompanying drawings, wherein:

FIG. 1 indicates diagrammatically the apparatus of a preferred embodiment of the invention; and FIG. 2 is a schematic diagram of the electrical measuring and control circuit associated therewith.

Turning now to FIG. 1 of such drawings, the apparatus of the invention is seen to comprise a rotating contact winding arbor, generally indicated at 1 and consisting of an electrically conductive resistor support member 2 and an electrically conductive brush support member 3, mechanically and electrically connected in the manner shown by pin 4 and electrically conductive strap 6.

Three spring contact brushes 7, preferably of beryllium copper, and mounted 120° apart, are fixedly attached to and maintained in contact with the brush support member 3 by the surface pressure of collar 8 mounted thereover. A notch 9, including two contact springs 11, preferably of beryllium copper, positioned therein, is formed in the end of the resistor support member remote from the brush support member.

Conductive bridging 12 of resistor core 13 is inserted within the said notch and maintained therein by the pressure of the said contact springs positioned therebetween. Spring contact brushes 7, collar 8, and the end of brush support member 3 to which same are affixed, are mounted with rotational freedom within the interior of stationary hollow contact member 40 in the manner shown, with the said brushes in surface contact with the interior walls of the stationary contact member to maintain a positive electrical contact therebetween as the brushes are rotated therewithin. Means for applying rotational power, not shown, are utilized adjacent end 15 of the resistor core to rotate the core and winding arbor assembly within the stationary contact member to thus effect winding of the wire drawn from a supply spool 5 about the core.

Lead screw 16 is positioned adjacent the winding arbor assembly with the axes thereof parallel. Lead screw guide 17 is rotatably mounted on the lead screw and movable therealong by the progress of the wire around the screw as the wire is wound about the core 13. Solenoid-actuated cutter 19 and retractable solenoid-controlled wire guide and contact 20 are positioned in the path of the wire as shown, with the former operative upon the actuation of the solenoid 22 associated therewith to sever the wire at the appropriate time, and the latter reciprocably mounted within the solenoid 21 associated therewith and retractable thereby to the position indicated by the dashed lines in FIG. 1.

Contact switches 18 and 41 are positioned within the path of travel of the lead screw guide in the manner shown and closed by abutment of the guide therewith as the latter is moved along the lead screw. Closure of contact switch 18 completes a circuit to activate solenoid 21 to retract wire guide and contact 20 and the wire being wound to the position indicated by the dashed lines. Closure of contact switch 41, on the other hand, functions to energize the measuring circuit means of FIG. 2 by completing a circuit to apply a voltage across the input terminals thereof. It is to be noted that contact switch 41 is always positioned sufficiently distant from contact switch 18 so that measuring circuit is never energized until wire guide and contact 20 has been retracted and an electrical contact established thereby with the wire being wound to complete the measuring circuit in the manner set forth in detail hereinbelow.

Heating element 23 is fixedly positioned in the manner shown in such location as to be immediately below the path assumed by the wire upon the retraction of the wire guide and contact 20. The heating element is included in the device of the invention to burn the insulation from the wire as the latter passes thereover to thus enable the formation of a good electrical contact between the wire and the wire guide and contact 20, and the inclusion of the resistance of the wire being wound in the measuring and control circuit of FIG. 2.

Turning now to FIG. 2, the measuring and control circuit is seen to comprise a Wheatstone bridge circuit, generally indicated at 24, and control means 25 associated therewith. Points $X_1$ and $X_2$ in the bridge circuit are electrically connected to the corresponding points $X_1$ and $X_2$ in the apparatus of FIG. 1, to thus place the resistance of the wire wound past retracted wire guide and contact 20, in the bridge circuit between apexes 26 and 27 thereof. Bridge resistor 28 is a standard resistor and adjustable to a resistance value equal to the desired value of the resistor being wound, with bridge resistor 29 consisting of a piece of wire from the same supply spool as the wire being wound and cut to a length 30 (see FIG. 1) equal to the distance between retracted wire guide and contact 20 and cutter 19. Resistor 29 is included in the bridge circuit to compensate for the resistance of the surplus length 30 of wire which extends from the point at which the wire ultimately wound on the core is terminated, i.e., cutter 19, to the point of contact with the bridge circuit, i.e., retracted wire guide and contact 20. This resistor is made necessary because the resistance of such surplus length of wire is included in, and affects the output of, the bridge circuit, but is not included in the resistance of the finished resistor as should be obvious.

The bridge circuit is further seen to include equal resistance value resistors 31 and 32, input terminals 33 and 34, and output terminals 35 and 36. The circuit details of the bridge insure that, as the resistance value in the bridge of the resistor being wound, i.e., $RX_1-X_2$, increases to become equal to the combined resistance values of adjustable resistor 28 and compensating resistor 29, the output of the bridge passes through zero with an attendant change in the polarity of output terminals 35 and 36.

Control means, indicated schematically at 25, are connected across the output terminals of the bridge and responsive to a change in the polarity thereof to activate solenoid-operated cutter 19 and sever the wire being wound upon the core to thus discontinue the winding operation. It is to this effect that such control means will preferably consist of a very fast-acting gating circuit comprising a solid state device to control a relay to perform the switching function necessary to the activation of the solenoid-operated cutter 19 at the proper time, i.e., when the resistance of the wire wound past cutter 19 has assumed the desired value.

At the initiation of a winding cycle, a piece of wire equal in length to distance 30 in FIG. 1 is cut from supply spool 5 and included in the bridge circuit as resistor 29. The resistance value of adjustable bridge resistor 28 is then established at the resistance value desired in the resistors to be wound. Bridging 12, of flat resistor core 13, is inserted between contact springs 11 in notch 9 of resistor support member 2, and the wire then drawn from the supply spool, threaded through guide 20 and cutter 19, wound around lead screw guide 17, and thence welded to the conductive resistor bridging at point 37. It is to be noted here that the position of lead screw guide 17 at the commencement of the winding operation is adjusted to be in substantial alignment with the point 37 at which the wire is welded to the conductive bridging.

The device is now ready for operation and, to this effect, rotation of the resistor core is effected with the result that the lead screw guide 17 will commence to move along the lead screw 16 toward contact switches 18 and 41 due to the rotation of the guide induced by the progress of the wire therearound as the wire is taken up on the core.

The winding operation continues in this manner until the lead screw guide has traveled far enough along the lead screw to abut and close contact switch 18, whereupon solenoid 21 is activated and the wire guide and contact 20 retracted to the position indicated by the dashed lines. The closure of contact switch 18 may also be utilized at this point to reduce the speed of rotation of resistor core 13 in any well-known manner to thus slow down the final stages of the winding operation, should such prove necessary or desirable. Since the wire is now guided immediately over heating element 23, the latter will function to burn the insulation therefrom, with the result that a good electrical contact is established between the now uninsulated wire and the wire guide and contact 20. Thus, the resistance of the wire being wound, i.e., $RX_1-X_2$, is placed in the bridge circuit. Abutment and closure of contact switch 41 by the lead screw guide 17 follows with resultant application of a voltage across the input terminals of the bridge.

Rotation of the core is continued until the resistance value of $RX_1-X_2$ becomes equal to the combined resistance values of R28 and R29, at which time the output of the bridge will commence to pass through zero and the polarity of bridge output terminals 35 and 36 will be reversed. The reversal of the polarity of the output terminals functions to key control means 35 responsive thereto to activate the solenoid-operated cutter 19, to thus sever the wire at this point and insure a substantial identity between the resistance value of the wire wound past the cutter 19, and ultimately on the core, and the desired resistance value as established by R28 in the bridge circuit.

At this point, all that remains to complete the finished resistor is the welding of the severed end of the wire to the core. Thence, the wound core and bridging assembly may be removed from the resistor support member, an unwound core and bridging assembly inserted therein, the position of the lead screw guide readjusted, and the winding process repeated.

Various modifications of the invention will become apparent to those skilled in the art after reading this disclosure. It is, therefore, intended that the matter contained in the foregoing description and annexed drawings be interpreted as illustrative only, and not in a limiting sense, when consideration is given to the appended claims. Thus, the invention might be used for measuring coil inductance or the conductivity of a component.

What is claimed is:

1. Apparatus for winding coils to a predetermined magnitude of an electrical property such as resistance or inductance comprising:
   rotatable means for winding wire about a core,
   a source of wire spaced from said rotatable means,
   detecting means mounted adjacent to the rotatable means to detect when an amount of wire almost sufficient to provide the predetermined magnitude has been wound,
   cutter means mounted between said rotatable means and said source,
   control means for operating said cutter means,
   measuring means for measuring the magnitude of an electrical property of the wire being wound, and
   means operable to connect the wire being wound to said measuring means when the detecting means detects that an amount of wire almost equal to that required has been wound, the measuring means activating the control means to cause the cutter means to sever the wire when the measuring means determines that the predetermined magnitude of the electrical property being measured has been reached.

2. Apparatus for winding coils to a precise predetermined magnitude of an electrical property comprising:
   rotatable means for winding a wide coil on a core,
   a source of wire spaced from said rotatable means,
   a guide and screw means mounted in spaced relation to said winding means and said source, said guide and screw means being operable to distribute wire over the core as it advances down the screw,
   contact switch means mounted in the path of the guide at a point related to, but less than, the number of turns to be wound on the core,
   cutter means mounted between said guide and screw means and said source,
   control means for activating the cutter, and bridge circuit means operable, upon the tripping of said contact switch by said guide, to measure an electrical property magnitude of the wire being wound, and upon the realization of a predetermined magnitude to cause activation of the cutter means by said control means for severance of the wire.

3. Apparatus for winding coils to a predetermined precise magnitude of an electrical property comprising:
   rotatable means including means for holding a core to be wound,
   a source of wire mounted in spaced relation to said rotatable means,
   lead screw and guide means mounted in spaced relation to said rotatable means and operable to progressively distribute wire on a core being wound,
   contact switch means mounted in the path of the advancing guide,
   cutter means mounted between said source and said guide,
   means for measuring the magnitude of the coil being wound,
   means connecting said contact switch to said measuring means so that the measuring means will be activated when the switch is tripped, and
   control means connected to the measuring means and the cutter, said control means being responsive to the measuring means and operable thereby to cause the cutter to sever the wire when the measuring means senses that the predetermined magnitude has been wound.

4. Apparatus for winding coils to a predetermined precise magnitude of an electrical property comprising:
   rotatable means including means for holding a core to be wound,
   a source of wire of indeterminate length mounted in spaced relation to said rotatable means,
   lead screw and guide means mounted in spaced relation to said rotatable means and operable to progressively distribute wire on a core being wound,
   switch means mounted in the path of the advancing guide,
   cutter means mounted between said source and said guide,
   solenoid operated guide means mounted in spaced relation to said cutter for deflecting the wire from its normal path,
   heating means mounted adjacent the deflected wire path,
   means for measuring the magnitude of an electrical property of the wire wound past said solenoid operated means,
   control means connected to said measuring means and operable to activate the cutter means to sever the wire being wound, and
   means connecting said switch to said solenoid operated guide so when the advancing screw mounted guide reaches a predetermined point, it will trip the switch, causing the solenoid operated guide to deflect the wire being fed to a new path where its insulation is burned off by the heating means, enabling the wire wound past said solenoid operated guide to be measured by the measuring means until the predetermined magnitude is reached, whereupon the measuring means will cause the control means to sever the wire.

5. An apparatus for winding resistors to a predetermined ohmic value comprising:
   rotatable arbor means including means for holding a core to be wound,
   a source of wire mounted in spaced relation to said arbor means,
   lead screw and guide means mounted in spaced relation to said arbor means and said source for progressively distributing wire on a core being wound, said guide being movable in a linear path along said screw,
   first contact switch means mounted in the path of the linearly movable guide,
   second contact switch means mounted in juxtaposition to said first switch means in the path of said guide,
   cutter means mounted in spaced relation to said guide means,
   solenoid operated guide means mounted below said cutter for deflecting the wire from its normal path,
   heating means mounted adjacent the deflected path of the wire,
   Wheatstone bridge means for measuring resistance magnitude, one arm of which includes a resistor of the predetermined resistance and a compensating resistance, and another arm of which includes the wire being wound,
   control means connected to said bridge means operable to activate the cutter means to sever the wire being wound, and
   means connecting the first switch means to the solenoid of the solenoid operated guide means and the second switch means to said bridge means, so that as the screw mounted guide advances it will trip the first switch when an ohmic valve almost that desired is reached, causing the solenoid operated guide to deflect the wire to a new path where said heating means burns off the wire insulation, enabling the resistance of the wire wound past the solenoid operated means to be measured, then as the winding continues, the advancing guide will trip the second switch which energizes the Wheatstone bridge measuring means by impressing a voltage thereacross, the winding continuing until the predetermined ohmic value is reached whereupon the change in polarity of the bridge means will cause the control means to activate the cutter to sever the wire at the exact predetermined resistance value.

References Cited by the Examiner

UNITED STATES PATENTS

| | | | |
|---|---|---|---|
| 2,494,051 | 1/1950 | McCoy et al. | 29—155.62 |
| 2,645,429 | 7/1953 | Scott et al. | 242—1.05 |
| 2,725,199 | 11/1955 | Bower | 242—1.05 |
| 2,782,368 | 2/1957 | McCarthy | 242—1.05 |
| 2,801,806 | 8/1957 | Taylor | 242—9 |
| 2,925,960 | 2/1960 | Clauss | 242—1.05 |
| 2,986,805 | 6/1961 | Jonke | 29—155.62 |
| 3,002,259 | 10/1961 | Fletcher et al. | 29—155.53 |
| 3,022,019 | 2/1962 | Simpson et al. | 242—9 |
| 3,039,707 | 6/1962 | Beck et al. | 242—9 |
| 3,065,772 | 11/1962 | Amey | 29—155.57 |

JOHN F. CAMPBELL, *Primary Examiner.*

J. W. BOCK, J. M. ROMANCHIK, *Assistant Examiners.*